(12) United States Patent
Tobimatsu et al.

(10) Patent No.: US 10,974,421 B2
(45) Date of Patent: Apr. 13, 2021

(54) FOAMED COMPOSITE MOLDING AND METHOD FOR MANUFACTURING FOAMED COMPOSITE MOLDING

(71) Applicant: KANEKA CORPORATION, Osaka (JP)

(72) Inventors: Yuki Tobimatsu, Osaka (JP);
Masahiko Sameshima, Osaka (JP)

(73) Assignee: KANEKA CORPORATION, Osaka (JP)

( * ) Notice: Subject to any disclaimer, the term of this patent is extended or adjusted under 35 U.S.C. 154(b) by 223 days.

(21) Appl. No.: 16/146,260

(22) Filed: Sep. 28, 2018

(65) Prior Publication Data

US 2019/0030765 A1 Jan. 31, 2019

Related U.S. Application Data

(63) Continuation of application No. PCT/JP2017/006744, filed on Feb. 23, 2017.

(30) Foreign Application Priority Data

Mar. 29, 2016 (JP) ............................. JP2016-066699

(51) Int. Cl.
*B29C 44/12* (2006.01)
*B60N 2/70* (2006.01)
(Continued)

(52) U.S. Cl.
CPC .......... *B29C 44/1271* (2013.01); *A47C 27/14* (2013.01); *B29C 39/10* (2013.01);
(Continued)

(58) Field of Classification Search
CPC ..... B29C 44/1271; B29C 44/00; B29C 39/10; A47C 27/14; B60N 2/7017;
(Continued)

(56) References Cited

U.S. PATENT DOCUMENTS 3,142,515 A * 7/1964 Wall .......................... A47C 7/20
297/452.51
4,349,494 A 9/1982 Fulmer
(Continued)

FOREIGN PATENT DOCUMENTS

CN 102741029 A 10/2012
JP S58-156451 U 10/1983
(Continued)

OTHER PUBLICATIONS

Office Action issued in Chinese Application No. 201780020534.2, dated Apr. 26, 2020 (19 pages).
(Continued)

*Primary Examiner* — David Sample
*Assistant Examiner* — Donald M Flores, Jr.
(74) *Attorney, Agent, or Firm* — Osha Bergman Watanabe & Burton LLP

(57) ABSTRACT

Embodiments of the present disclosure relate to making polyurethane foam less likely to become separated from an in-mold foamed molded product unit, the in-mold foamed molded product unit including an in-mold foamed molded product and an insert material which are integrally provided. A foamed composite molded product is configured such that a portion of an insert material is exposed to an outside of an in-mold foamed molded product, and is in contact with polyurethane foam.

11 Claims, 8 Drawing Sheets

(51) Int. Cl.
*B29C 44/00* (2006.01)
*A47C 27/14* (2006.01)
*B29C 39/10* (2006.01)
B29K 75/00 (2006.01)
B29K 105/04 (2006.01)
B29K 705/00 (2006.01)
B29L 31/30 (2006.01)
B29L 31/00 (2006.01)

(52) U.S. Cl.
CPC .......... *B29C 44/00* (2013.01); *B60N 2/7017* (2013.01); *B29K 2075/00* (2013.01); *B29K 2105/04* (2013.01); *B29K 2705/00* (2013.01); *B29L 2031/3005* (2013.01); *B29L 2031/771* (2013.01); *Y10T 428/24273* (2015.01); *Y10T 428/24331* (2015.01)

(58) Field of Classification Search
CPC .......... B29K 2075/00; B29K 2105/04; B29K 2705/00; B29L 2031/3005; B29L 2031/771
See application file for complete search history.

(56) References Cited

U.S. PATENT DOCUMENTS

| | | |
|---|---|---|
| 2008/0277955 A1 | 11/2008 | Sato |
| 2010/0063170 A1 | 3/2010 | Ishida et al. |
| 2010/0267850 A1 | 10/2010 | Yoshida et al. |
| 2011/0221254 A1* | 9/2011 | Lindsay ............. B60N 2/686 297/452.18 |
| 2011/0278902 A1 | 11/2011 | Galbreath et al. |
| 2012/0286445 A1 | 11/2012 | Ohta |
| 2013/0197112 A1 | 8/2013 | Fukuzawa et al. |
| 2013/0230713 A1 | 9/2013 | Yoshida et al. |
| 2013/0231409 A1 | 9/2013 | Fukuzawa et al. |
| 2016/0167263 A1 | 6/2016 | Nabeshima et al. |
| 2017/0001548 A1* | 1/2017 | Iwakata ............. B60N 2/289 |

FOREIGN PATENT DOCUMENTS

| | | |
|---|---|---|
| JP | S63-197406 A | 8/1988 |
| JP | S63-135894 U | 9/1988 |
| JP | H02-265714 A | 10/1990 |
| JP | H04-303402 A | 10/1992 |
| JP | H10-080337 A | 3/1998 |
| JP | 2003-201360 A | 7/2003 |
| JP | 2006-117842 A | 5/2006 |
| JP | 2008/239794 A | 10/2008 |
| JP | 2010-012687 A | 1/2010 |
| JP | 2011-230732 A | 11/2011 |
| JP | 2012-171104 A | 9/2012 |
| JP | 2014-118474 A | 6/2014 |
| JP | 2015-155146 A | 8/2015 |
| JP | 2015-174340 A | 10/2015 |
| WO | 2007/034722 A1 | 3/2007 |
| WO | 2009/075208 A1 | 6/2009 |
| WO | 2009/150939 A1 | 12/2009 |
| WO | 2015/016157 A1 | 2/2015 |
| WO | 2015/137363 A1 | 9/2015 |
| WO | 2016/152243 A1 | 9/2016 |

OTHER PUBLICATIONS

Extended European Search Report issued in corresponding European Application No. 177738951; dated Nov. 5, 2019 (8 pages).
International Search Report issued in International Application No. PCT/JP2017/006744, dated Apr. 4, 2017 (2 pages).
International Preliminary Report on Patentability issued in International Application No. PCT/JP2017/006744, dated Oct. 11, 2018 (10 pages).

* cited by examiner

FIG. 5(A)
FIG. 5(B)
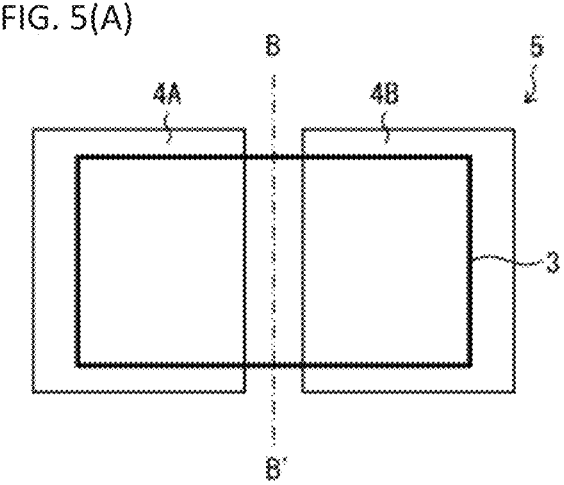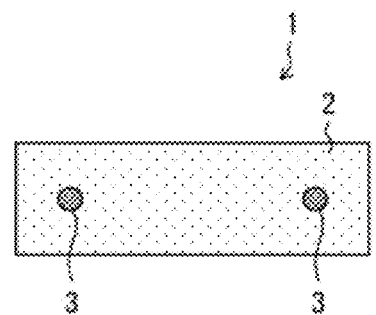
FIG. 5(C)
FIG. 5(D)
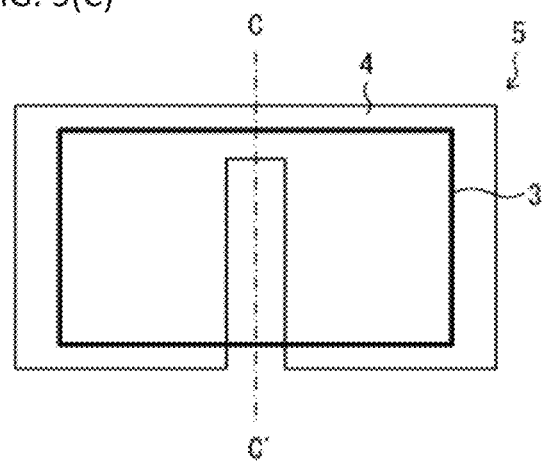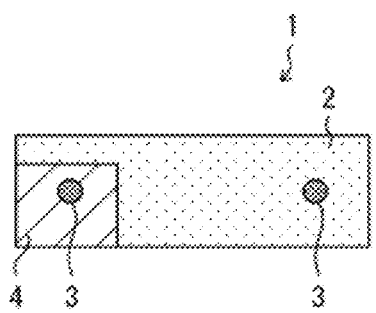

FOAMED COMPOSITE MOLDING AND METHOD FOR MANUFACTURING FOAMED COMPOSITE MOLDING

TECHNICAL FIELD

One or more embodiments of the present invention relate to a foamed composite molded product and a method of producing the foamed composite molded product.

BACKGROUND

Conventionally, a vehicle seat has typically been produced by providing a seat body made of polyurethane foam in an integrated manner with a metal wire embedded therein. The metal wire serves as an insert material for stabilizing the shape of the vehicle seat. Recently, in view of achieving vehicle weight reduction, cost reduction, and the like, there has been proposed a configuration in which polyurethane foam is combined with an in-mold foamed molded product unit, which is molded from thermoplastic resin. The in-mold foamed molded product unit is obtained by insert molding in which an insert material (for example, a metal wire) is provided in an in-mold foamed molded product, made of thermoplastic resin expanded particles. The in-mold foamed molded product unit is used as a core material of the vehicle seat. The vehicle seat is obtained by providing the in-mold foamed molded product unit integrally with the polyurethane foam and then covering the in-mold foamed molded product unit and the polyurethane foam with a seat cover.

However, in a case where the in-mold foamed molded product unit and the polyurethane foam are molded integrally, there is the possibility that the in-mold foamed molded product and the polyurethane foam will not adhere to each other and will therefore easily separate. As such, there is a risk of a reduction in passenger comfort occurring due to separation of the in-mold foamed molded product and the polyurethane foam.

Examples of techniques that have been previously disclosed include the inventions in Patent Literatures 1 to 3. In Patent Literature 1, a surface of a molded product (in-mold foamed molded product) made of thermoplastic resin includes a contact region at which the molded product comes into contact with a different-material layer (polyurethane foam). The contact region is heated to a temperature which is not less than 80% of a softening temperature of the molded product. This heating causes expandable resin particles in the region of contact to soften and expand so as to form unevenness in the region of contact. The different-material layer is provided so as to enter depressions in the unevenness.

Patent Literature 2 discloses carrying out an adhesiveness-providing treatment, such as a corona discharge treatment or coating with an anchor coat agent, between padding (polyurethane foam) and a foamed molded product (in-mold foamed molded product) made of olefin resin. This increases the adhesion strength between the surface of the foamed molded product and the surface of the padding.

Patent Literature 3 discloses a configuration in which an opening is provided to a base material layer (in-mold foamed molded product) made of olefin resin. Polyurethane foam enters into the opening in the base material layer. This causes the base material layer and the polyurethane foam to be in close contact over a large area and in a complex manner. As such, the base material layer and the polyurethane foam are unified in a laminar manner with a high bonding strength.

Patent Literature 4 discloses a configuration in which an outer envelope foam (polyurethane foam) is adhered to a reinforcement foam (in-mold foamed molded product) along the entire surface of the reinforcement foam.

In this way, the in-mold foamed molded products of Patent Literatures 1 to 3, adhesion to the polyurethane foam has been improved.

CITATION LIST

Patent Literature

[Patent Literature 1]
Japanese Patent Application Publication, Tokukai, No. 2012-171104
[Patent Literature 2]
Japanese Patent Application Publication, Tokukaihei, No. 02-265714
[Patent Literature 3]
Japanese Patent Application Publication, Tokukai, No. 2015-155146
[Patent Literature 4]
Japanese Utility Model Application Publication, Jitsukaisho, No. 58-156451

The inventions of Patent Literatures 1 to 3 each include a means of improving the adhesion strength between (i) an in-mold foamed molded product made of thermoplastic resin and (ii) polyurethane foam. However, thermoplastic resin by its nature has poor adhesion with polyurethane foam. As such, even though the adhesion strength between the in-mold foamed molded product and the polyurethane foam is improved, the adhesion strength is still insufficient.

SUMMARY

One or more embodiments of the present invention relate to providing (i) a foamed composite molded product in which polyurethane foam is unlikely to become separated from an in-mold foamed molded product unit, the in-mold foamed molded product unit including an in-mold foamed molded product and an insert material which are integrally molded, and (ii) a method of producing the foamed composite molded product.

In one or more embodiments of the present invention, a foamed composite molded product may include: an in-mold foamed molded product made of thermoplastic resin; an insert material molded integrally with the in-mold foamed molded product; and polyurethane foam, at least a portion of the insert material being exposed to an outside of the in-mold foamed molded product, the portion of the insert material which portion is exposed to the outside of the in-mold foamed molded product being in contact with the polyurethane foam.

With the above configuration, at least a portion of the insert material molded integrally with the in-mold foamed molded product is exposed. This makes it possible for the exposed part of the insert material to adhere to the polyurethane foam. It is also possible for the polyurethane foam to envelop the exposed part of the insert material. As such, used as a material of the insert material is a material which has better adhesion with the polyurethane foam than does the in-mold foamed molded product. This makes it possible to achieve a foamed composite molded product in which polyurethane foam is unlikely to become separated from an in-mold foamed molded product unit, the in-mold foamed molded product unit including an in-mold foamed molded product and an insert material which are integrally molded.

Note that the insert material may have a higher strength than the in-mold foamed molded product.

A method of producing a foamed composite molded product in accordance with one or more embodiments of the present invention includes the steps of: preparing an in-mold foamed molded product unit which includes (i) an in-mold foamed molded product made of thermoplastic resin and (ii) an insert material molded integrally with the in-mold foamed molded product, at least a portion of the insert material being exposed to an outside of the in-mold foamed molded product; and forming polyurethane foam such that the polyurethane foam is in contact with the portion of the insert material which portion is exposed to the outside of the in-mold foamed molded product.

With the above method, at least a portion of the insert material integrally molded with the in-mold foamed molded product is adhered to the polyurethane foam and/or enveloped by the polyurethane foam. As such, the method makes it possible to provide a foamed composite molded product in which polyurethane foam is unlikely to become separated from an in-mold foamed molded product unit.

One or more embodiments of the present invention bring about an effect of making polyurethane foam unlikely to become separated from an in-mold foamed molded product unit, the in-mold foamed molded product unit including an in-mold foamed molded product and an insert material which are integrally molded.

BRIEF DESCRIPTION OF THE DRAWINGS

FIG. 2 exemplarily illustrates a structure in which an insert material is exposed by an opening formed in the in-mold foamed molded product.

FIGS. 5(A) and 5(C) are each a plan view illustrating an in-mold foamed molded product unit in accordance with Embodiment 2 of the present disclosure. FIGS. 5(B) and 5(D) are each a cross-sectional view of the foamed composite molded product illustrated in FIGS. 5(A) and 5(C), respectively, in accordance with Embodiment 2 of the present disclosure.

DETAILED DESCRIPTION OF THE EMBODIMENTS

The following description will discuss one or more embodiments of the present invention with reference to FIGS. 1 to 7.

One or more embodiments of the present invention relate to making polyurethane foam less likely to become separated from an in-mold foamed molded product unit. However, adhesion is poor between polyurethane foam and an in-mold foamed molded product made of olefin resin or the like. Furthermore, in a foamed composite molded product for use in a vehicle seat, polyurethane foam is typically formed on a surface of only a part of the in-mold foamed molded product. As such, it is unfeasible to prevent separation of the polyurethane foam from the in-mold foamed molded product by forming the polyurethane foam in a manner so as to envelop the in-mold foamed molded product. After diligent study in view of these issues, the inventors of the present disclosure arrived at the following techniques.

[Configuration of Foamed Composite Molded Product]

Figure 1:
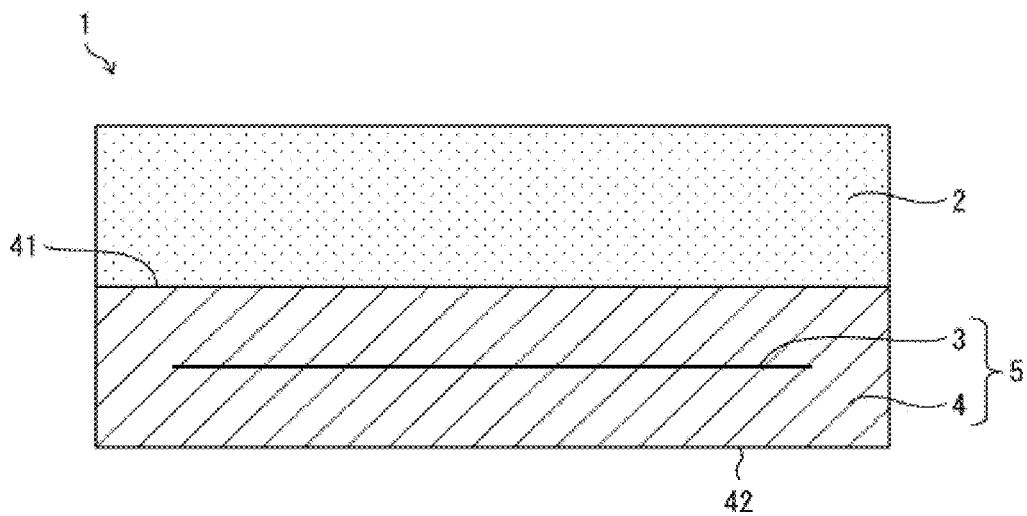
FIG. 1 is an external lateral view illustrating a foamed composite molded product in accordance with one or more embodiments of the present invention.

FIG. 1 is an external lateral view illustrating a foamed composite molded product in accordance with one or more embodiments of the present invention.

As illustrated in FIG. 1, a foamed composite molded product 1 includes polyurethane foam 2 and an in-mold foamed molded product unit 5 which have been molded integrally with each other. The in-mold foamed molded product unit 5 includes an insert material 3 and an in-mold foamed molded product constituted by thermoplastic resin expanded particles. In the example illustrated in FIG. 1, an in-mold foamed molded product 4, constituted by polyolefin-based resin expanded particles, is molded integrally with the insert material 3. The foamed composite molded product 1 can be produced by forming the polyurethane foam 2 so as to be in contact with a portion of the insert material 3, which portion is exposed to the outside of the in-mold foamed molded product 4. This is illustrated in more detail in FIG. 2 onward. The in-mold foamed molded product may be made of polyolefin resin.

In a case where, for example, the foamed composite molded product 1 is to be mounted to a vehicle, the polyurethane foam 2 may be (i) formed on at least a surface of the in-mold foamed molded product 4 which surface is on a side away from a vehicle-mounting side of the in-mold foamed molded product 4 but (ii) not formed on a surface on the vehicle-mounting side. That is, as illustrated in FIG. 1, the polyurethane foam 2 may be formed so as to cover only a portion of the in-mold foamed molded product 4. In other words, as illustrated in FIG. 1, at least a portion of the surface of the in-mold foamed molded product 4 may be left uncovered by the polyurethane foam 2 so as to be exposed. For example, the polyurethane foam 2 may be formed in a manner so as to be formed on a first surface 41 of the in-mold foamed molded product 4 but not to a second surface 42 of the in-mold foamed molded product 4, which second surface 42 is on a reverse side with respect to the first surface 41.

The insert material 3 is provided inside the in-mold foamed molded product 4. The insert material 3 may be made of any of a variety of materials, provided that the insert material 3 is stronger against breakage (i.e., has a higher tensile strength) than the in-mold foamed molded product 4.

In other words, the insert material 3 may be made of any of a variety of materials provided that the insert material 3 is harder than the in-mold foamed molded product 4, or, if the material of the insert material 3 is softer than the in-mold foamed molded product 4, provided that the insert material 3 is less easily broken than the in-mold foamed molded product 4. The insert material 3 may be made of a material having high affinity with the polyurethane foam 2. Possible examples of materials for the insert material 3 include metal, inorganic fiber (carbon fiber, glass fiber, and the like), fiber reinforced plastic (carbon fiber reinforced plastic, glass fiber reinforced plastic, and the like), fiber reinforced metal, wood, and concrete. Out of these examples, metal wire may be preferable as the material of the insert material 3. Examples of metals which can be used for the insert material 3 include iron, stainless steel, zinc, and aluminum.

A base material resin used for the thermoplastic resin expanded particles is not particularly limited. Possible examples include polyolefin resin, polystyrene resin, styrene-modified polyolefin resin (olefin-modified polystyrene resin), and polyester resin. Out of these examples, the use of an olefin resin such as polyolefin resin or styrene-modified polyolefin resin provides a superior shock-absorbing property, chemical resistance, heat resistance, and strain recovery rate after compression, and allows for easy recycling.

The polyolefin resin is not particularly limited. Possible examples include polypropylene resin and polyethylene resin. Examples of the polypropylene resin include a propylene homopolymer, an ethylene/propylene copolymer, and an ethylene/propylene/1-butene copolymer. Examples of the polyethylene resin include an ethylene homopolymer, high density polyethylene resin, medium density polyethylene resin, low density polyethylene resin, and linear low-density polyethylene resin. Specific examples include an ethylene/1-butene copolymer and an ethylene/4-methyl-1-pentene copolymer. The ethylene/propylene copolymer, the ethylene/propylene/1-butene copolymer, the ethylene/1-butene copolymer, and the ethylene/4-methyl-1-pentene copolymer can each be a random copolymer or a block copolymer.

A method of producing the expanded particle is not particularly limited. A conventionally known production method can be employed. For example, in the case of polyolefin-based resin expanded particles, possible examples of the production method include the methods disclosed in International Patent Application Publication No. WO 2009/075208, Japanese Patent Application Publication, Tokukai, No. 2006-117842, and the like. In the case of polystyrene-based resin expanded particles, possible examples of the production method include the methods disclosed in Japanese Patent Application Publication, Tokukai, No. 2003-201360, Japanese Patent Application Publication, Tokukai, No. 2014-118474, International Patent Application Publication No. WO 2015/137363, and the like. These documents describe expanded particles as pre-expanded particles. In the case of styrene-modified polyolefin-based resin expanded particles, possible examples of the production method include the methods disclosed in Japanese Patent Application Publication, Tokukai, No. 2008-239794, International Patent Application Publication No. WO2016/152243, and the like. Note that the method of producing the expanded particles is not limited to the above methods.

Expanded particles obtained via the above methods can be made to include or be coated with an additive as necessary by use of a conventionally known method. Examples of such an additive include a flame retarder, an anti-static agent, and a colorant. Particle size of the expanded particles is not particularly limited and can be, for example, 1 mm to 10 mm. In terms of a mold-filling property, the particle size may be 1 mm to 5 mm or 1 mm to 3 mm.

The expansion ratio of the expanded particles is not particularly limited and can be, for example, 3 times to 90 times. In terms of mechanical strength and moldability, the expansion ratio may be 5 times to 60 times or 5 times to 45 times.

Expanded particles as described above are commercially available as, for example, EPERAN-PP and EPERAN-XL (manufactured by Kaneka Corporation), and are easily acquired.

In one or more of the present embodiments, for convenience, the in-mold foamed molded product 4 is hereinafter described as being an in-mold foamed molded product made of polyolefin-based resin expanded particles. The in-mold foamed molded product 4 is molded, with use of a mold apparatus for in-mold foam molding, by heating polyolefin-based resin expanded particles so as to expand the particles and cause them to be fused to each other. A detailed description is as follows.

The mold apparatus for in-mold foam molding includes (i) a concave mold unit having a concave mold and a concave mold housing which holds the concave mold and (ii) a convex mold unit having a convex mold and a convex mold housing which holds the convex mold. The concave mold and the convex mold form a space when closed together. Polyolefin-based resin expanded particles are filled into this space. The expanded particles may have an inorganic gas or the like impregnated therein beforehand so as to increase internal pressure, or may be expanded particles which are at atmospheric pressure and not internally pressurized. After the polyolefin-based resin expanded particles are filled into the space, saturated steam pressure of approximately 0.04 MPa(G) to 0.40 MPa(G) is supplied to chambers respectively provided to the concave mold housing and the convex mold housing. This heats the polyolefin-based resin expanded particles so as to expand the particles and cause them to be fused to each other. In this way, the in-mold foamed molded product 4 is obtained by in-mold foam molding of the polyolefin-based resin expanded particles.

The in-mold foamed molded product unit 5 is obtained by providing the insert material 3 to the convex mold or the concave mold of the mold apparatus for the in-mold foamed molded product and carrying out the above technique for producing the in-mold foamed molded product, such that the in-mold foamed molded product 4 is molded integrally with the insert material 3. The in-mold foamed molded product unit 5 can be used as, for example, a core material for a vehicle seat. A vehicle seat can be obtained by molding the in-mold foamed molded product unit 5 and the polyurethane foam 2 integrally and then covering the in-mold foamed molded product unit 5 and the polyurethane foam 2 with a seat cover.

In order to improve adhesion between the polyurethane foam 2 and the in-mold foamed molded product unit 5, prepared firstly is a unit in which the in-mold foamed molded product 4 is molded integrally with the insert material 3 such that the insert material 3 is inside the in-mold foamed molded product 4. A portion of the insert material 3 is exposed to the outside of the in-mold foamed molded product 4 (step of preparing in-mold foamed molded product unit). As such, the portion of the insert material 3 which is exposed to the outside of the in-mold foamed molded product 4 comes into contact with the polyurethane foam 2 (step of providing the polyurethane foam such that the polyurethane foam is in contact with the portion exposed to the outside of the in-mold foamed molded product of the in-mold foamed molded product unit). Hereinafter, the portion of the insert material 3 which is exposed to the outside of the in-mold foamed molded product 4 is also referred to as an "exposed section". The polyurethane foam 2 and the insert material 3 of the in-mold foamed molded product unit 5 adhere to each other favorably when there is a high affinity between them. This makes it possible to improve the adhesion strength between the polyurethane foam 2 and the in-mold foamed molded product unit 5. The foamed composite molded product 1 is obtained by adhering the polyurethane foam 2 and the in-mold foamed molded product unit 5 together (method of producing the foamed composite molded product).

In other words, the foamed composite molded product 1 in accordance with one or more embodiments of the present invention may be configured such that (i) at least a portion of the insert material 3 is exposed to the outside of the in-mold foamed molded product 4 and (ii) at least a portion of the insert material 3 is in contact with the polyurethane foam 2.

Embodiment 1

Figure 2:
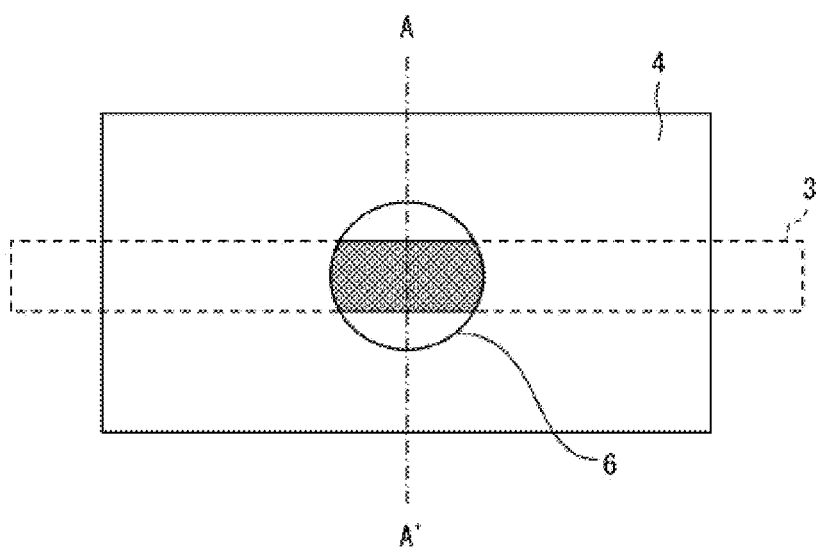
FIG. 2 is a plan view illustrating a configuration of an in-mold foamed molded product unit in accordance with Embodiment 1.

FIG. 2 is a plan view illustrating a configuration of an in-mold foamed molded product unit in accordance with Embodiment 1. FIG. 2 exemplarily illustrates a structure in which an insert material is exposed by an opening (or hole) formed in the in-mold foamed molded product. FIG. 2 illustrates a portion of an in-mold foamed molded product 4 which portion comes into contact with polyurethane foam 2.

As illustrated in FIG. 2, at least one opening 6 is formed in an in-mold foamed molded product 4. The at least one opening 6 exposes a portion of an insert material 3. The portion of the insert material 3 exposed by the at least one opening 6 comes into contact with the polyurethane foam 2. This makes it possible to improve adhesion between the polyurethane foam 2 and an in-mold foamed molded product unit 5.

The at least one opening 6 is provided to at least one position on the in-mold foamed molded product 4. Furthermore, the at least one opening 6 includes at least one opening 6 provided at a position such that the insert material 3 comes into contact with the polyurethane foam 2. In consideration of adhesion between the insert material 3 and the polyurethane foam 2, the at least one opening may be plural in number and large in size. The number, shape, and size of the at least one opening are not particularly limited but can be adjusted as necessary in consideration of the desired strength and cushioning property of a foamed composite molded product 1. A larger size of the in-mold foamed molded product 4 enables a larger size of the at least one opening 6. As such, there is no upper limit to the size of the at least one opening 6. However, in terms of enabling wide use, the diameter of the at least one opening 6 may be, for example, not less than 1.0 mm and not more than 200.0 mm, not less than 5.0 mm and not more than 30.0 mm, or not less than 5.0 mm and not more than 20.0 mm. In a case where the shape of the at least one opening 6 does not allow for description in terms of diameter, the diameter is considered to be a dimension at which distance is greatest along an unobstructed straight line between two points on the perimeter of the at least one opening 6.

The shape of the at least one opening 6 can be a shape other than the circular shape illustrated in FIG. 2. For example, the at least one opening 6 can be shaped so as to be elliptical or polygonal (rectangular, rhombic, triangular, star-shaped, L-shaped, cross-shaped, etc.). Furthermore, the at least one opening 6 may include at least one protrusion which protrudes from a bottom surface or from an inner wall of the at least one opening 6.

Figure 3A:
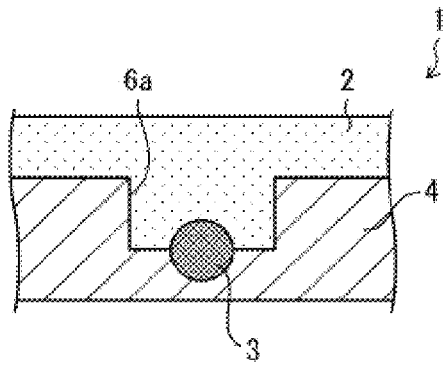
FIGS. 3(A), 3(B), and 3(C) consist of cross-sectional views each illustrating a different opening formed in the in-mold foamed molded product, in accordance with Embodiment 1.
Figure 3B:
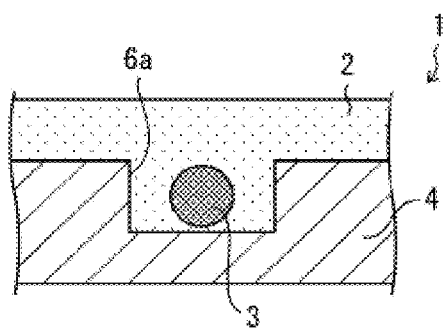
Figure 3C:
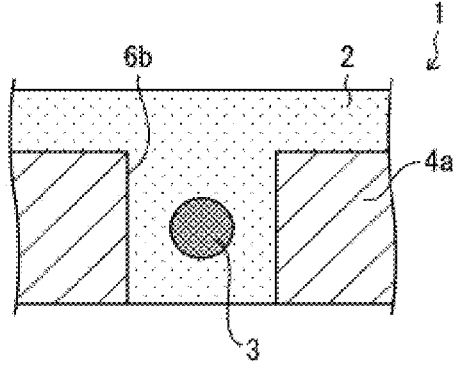

FIGS. 3(A) to 3(C) are each a cross-sectional view illustrating a different opening formed in the in-mold foamed molded product 4, in accordance with Embodiment 1. Each of FIGS. 3(A) to 3(C) is a cross-sectional view taken along the line A-A' indicated in FIG. 2.

FIG. 3(A) illustrates a case where (i) the at least one opening 6 provided to the in-mold foamed molded product 4 (see FIG. 2) is a blind hole 6a and (ii) a portion of the insert material 3 is inset into a bottom of the blind hole 6a. In other words, in the illustrated configuration, the blind hole 6a exposes the insert material 3 to the outside of the in-mold foamed molded product 4.

As illustrated in FIG. 3(A), the blind hole 6a is a recess which does not pass through the in-mold foamed molded product 4. The insert material 3 is inset into the bottom of the blind hole 6a, and only an upper side of an exposed part of the insert material 3 exposed to the outside of the in-mold foamed molded product 4. With this structure, because the polyurethane foam 2 cannot envelop the insert material 3, the insert material 3 may be made of a material (such as iron) having a high affinity with the polyurethane foam 2 such that adhesion strength is sufficient. This makes it possible for the exposed section of the insert material 3 and the polyurethane foam 2 to adhere to each other.

FIG. 3(B) illustrates a case where (i) the at least one opening 6 provided to the in-mold foamed molded product 4 (see FIG. 2) is a blind hole 6a and (ii) the insert material 3 is distanced from the bottom of the blind hole 6a. In other words, in the illustrated configuration, the blind hole 6a exposes the insert material 3 to the outside of the in-mold foamed molded product 4.

As illustrated in FIG. 3(B), the insert material 3 is distanced from the bottom of the blind hole 6a such that the insert material 3 is exposed to the outside of the in-mold foamed molded product 4, from a top end of the insert material 3 to a bottom end of the insert material 3. In comparison to the configuration of FIG. 3(A), this configuration makes it possible to increase the area of contact between the insert material 3 and the polyurethane foam 2. This configuration also makes it possible for the polyurethane foam 2 to envelop the insert material 3. This makes the polyurethane foam 2 less likely to become separated from the exposed section of the insert material 3.

FIG. 3(C) illustrates a case where an opening provided to an in-mold foamed molded product 4a (variation of the in-mold foamed molded product 4) is a through hole 6b. In other words, in the illustrated configuration, the through hole 6b exposes the insert material 3 to the outside of the in-mold foamed molded product 4a.

As illustrated in FIG. 3(C), the through hole 6b passes through the in-mold foamed molded product 4a. Furthermore, the insert material 3 is exposed to the outside of the in-mold foamed molded product 4a, from a top end of the insert material 3 to a bottom end of the insert material 3. In comparison to the configuration of FIG. 3(B), this further increases the strength of adhesion between the insert material 3 and the polyurethane foam 2. Because the through hole 6b passes through the in-mold foamed molded product 4a, the portion of the polyurethane foam 2 surrounding the exposed section of the insert material 3 has a greater thickness. This decreases the risk of the polyurethane foam 2 breaking and therefore increases the strength of adhesion between the insert material 3 and the polyurethane foam 2. This configuration also makes it possible for the polyurethane foam 2 to envelop the insert material 3.

Figure 4A:
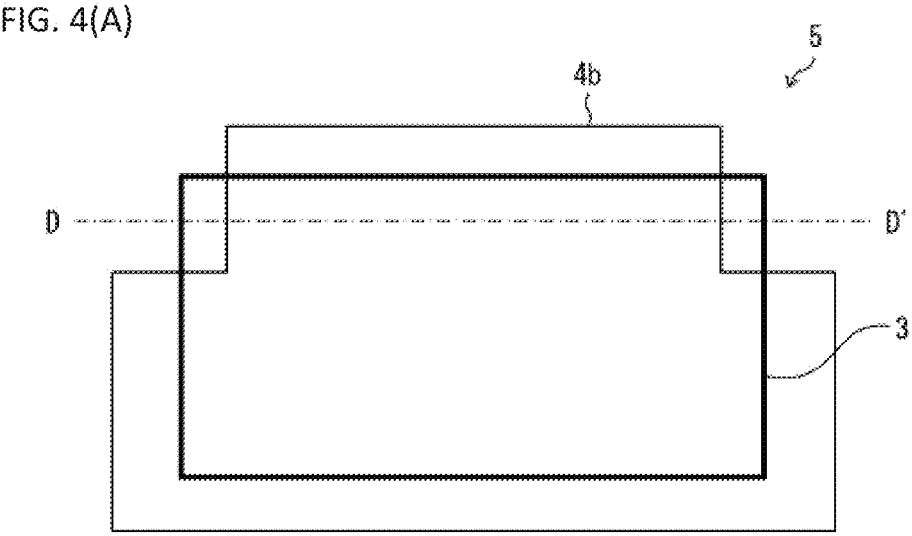
FIG. 4(A) is a plan view illustrating yet another in-mold foamed molded product unit in accordance with Embodiment 1 of the present disclosure.
Figure 4B:
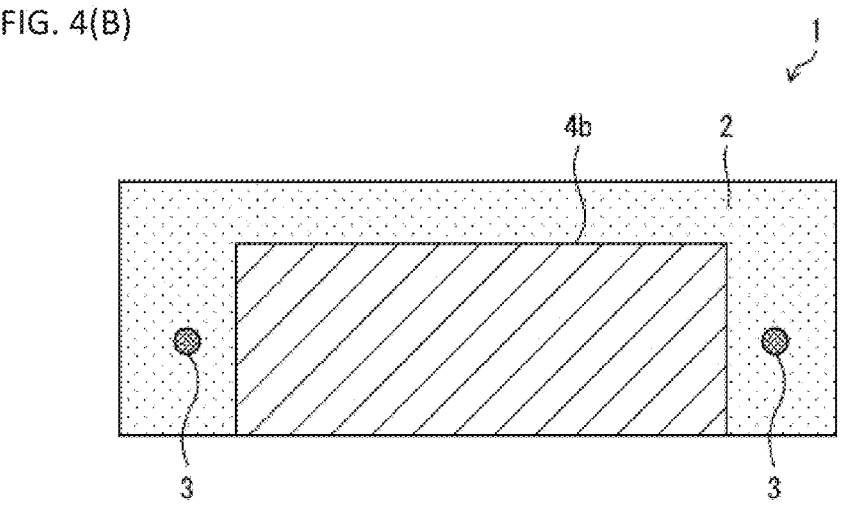
FIG. 4(B) is a cross-sectional view of the foamed composite molded product illustrated in FIG. 4(A), in accordance with Embodiment 1 of the present disclosure.

Instead of the configuration in which the at least one opening 6 is provided as illustrated in FIG. 3(A) to 3(C), it is possible to employ a configuration in which a portion of the insert material 3 protrudes from a surface of the in-mold foamed molded product 4. In other words, a configuration may be employed in which, as illustrated in FIG. 4(A), the insert material 3 is exposed to the outside of an in-mold foamed molded product 4b by the perimeter of an outer surface of the in-mold foamed molded product 4b (particularly, such that the insert material 3 is further outward than an outer contour of the in-mold foamed molded product 4b). FIG. 4(A) is a plan view illustrating yet another in-mold foamed molded product unit in accordance with Embodiment 1 of the present disclosure. FIG. 4(B) is a cross-sectional view of the foamed composite molded product illustrated in FIG. 4(A), in accordance with Embodiment 1 of the present disclosure. The in-mold foamed molded product 4b is a variation of the in-mold foamed molded product 4. The in-mold foamed molded product 4b is structured such that its perimeter has a cutout portion at which the insert material 3 is exposed. FIG. 4(B) is a cross-sectional view taken along the line D-D' indicated in FIG. 4(A). As illustrated in FIG. 4(B), portions of the insert material 3 exposed to the outside of the in-mold foamed molded product 4b are covered, along their perimeters, by the polyurethane foam 2. This configuration makes it possible for those portions of the insert material 3 which are protruding from the in-mold foamed molded product 4b to adhere with the polyurethane foam 2. This configuration also makes it possible for the polyurethane foam 2 to envelop those portions of the insert material 3 which are protruding from the in-mold foamed molded product 4b. This configuration makes it possible to increase the area of contact between the insert material 3 and the polyurethane foam 2. The configuration therefore makes it possible to make the polyurethane foam 2 less likely to become separated from the insert material 3.

A larger diameter of the insert material 3 enables an increased area of contact between the insert material 3 and the polyurethane foam 2. However, increasing the diameter of the insert material 3 leads to an increase in the weight of the insert material 3. Such an increase in weight would increase the weight of the vehicle seat and thus be contrary to the reduction of vehicle weight. As such, in a case where, for example, the insert material 3 is a wire made of iron, the diameter of the wire may be not less than 0.1 mm and not more than 10.0 mm, or not less than 3.0 mm and not more than 5.0 mm. In a case where, for example, the insert material 3 is a wire which is made of iron and configured to be hollow inside so as to be in the form of a pipe, the outer diameter of the pipe may be not less than 6.0 mm and not more than 20.0 mm, or not less than 8.0 mm and not more than 13.0 mm.

Embodiment 2

FIGS. 5(A) and 5(C) are each a plan view illustrating an in-mold foamed molded product unit in accordance with Embodiment 2 of the present disclosure. FIGS. 5(B) and 5(D) are each a cross-sectional view of the foamed composite molded product illustrated in FIGS. 5(A) and 5(C), respectively, in accordance with Embodiment 2 of the present disclosure. FIGS. 5(A) to 5(D) each illustrate a configuration in which an in-mold foamed molded product 4 is divided into two. In FIG. 5(A), the in-mold foamed molded product 4 is split into two parts (i.e., two molded body pieces 4A and 4B) at a boundary dividing the in-mold foamed molded product 4. In FIG. 5(C), a portion of the in-mold foamed molded product 4 has been cut out at a boundary dividing the in-mold foamed molded product 4 into two.

FIG. 5(A) illustrates a case where the in-mold foamed molded product 4 is split into two molded body pieces 4A and 4B. As illustrated in FIG. 5(A), the insert material 3 is in the form of a loop embedded so as to be in both of the molded body pieces 4A and 4B. Splitting the in-mold foamed molded product 4 into two parts in this manner causes the insert material 3 exposed to the outside of the in-mold foamed molded product 4 at a gap formed by two of a plurality of molded body pieces into which the in-mold foamed molded product 4 is split. Here, "a gap formed by two" refers to a gap between two molded body pieces. With this configuration, the insert material 3 is exposed to the outside of the in-mold foamed molded product 4 at two positions. As such, when the in-mold foamed molded product unit 5 and the polyurethane foam 2 are molded integrally, the portions of the insert material 3 exposed to the outside of the in-mold foamed molded product 4 come into contact with the polyurethane foam 2. This makes is possible to improve adhesion between the in-mold foamed molded product unit 5 and the polyurethane foam 2 and also allows the polyurethane foam 2 to envelop the insert material 3. Note that the in-mold foamed molded product 4 may also be split into three or more parts. That is, the in-mold foamed molded product 4 may be split so as to include three or more molded body pieces.

FIG. 5(B) is a cross-sectional view taken along the line B-B' indicated in FIG. 5(A). As illustrated in FIG. 5(B), portions of the insert material 3 exposed to the outside of the in-mold foamed molded product 4 are covered, along their perimeters, by the polyurethane foam 2. This allows the polyurethane foam 2 to be in contact with the exposed portions of the insert material 3 along an entire perimeter of the exposed portions and therefore makes it possible to improve adhesion between the in-mold foamed molded product unit 5 and the polyurethane foam 2.

FIG. 5(C) illustrates a configuration in which a portion of the in-mold foamed molded product 4 is cut out so as to provide a groove which transects one of two opposing sides of a rectangle corresponding to an outline of the insert material 3. As illustrated in FIG. 5(C), at a surface of the in-mold foamed molded product 4 which surface comes into contact with the polyurethane foam 2, a portion of the in-mold foamed molded product 4 is cut out at the boundary dividing the in-mold foamed molded product 4 into two. With this configuration, the insert material 3 is exposed to the outside of the in-mold foamed molded product 4 at only one position. As such, when the polyurethane foam 2 is formed on the in-mold foamed molded product unit 5, the portion of the insert material 3 exposed to the outside of the in-mold foamed molded product 4 comes into contact with the polyurethane foam 2. This makes is possible to improve adhesion between the in-mold foamed molded product unit 5 and the polyurethane foam 2 and also allows the polyurethane foam 2 to envelop the insert material 3. With the configuration of FIG. 5(A), the insert material 3 is exposed to the outside of the in-mold foamed molded product 4 and in contact with the polyurethane foam 2 at two positions, and adhesion strength is therefore higher in comparison to the configuration of FIG. 5(A). However, with the configuration of FIG. 5(C), the in-mold foamed molded product 4 is not completely split into two parts. This reduces the risk of the polyurethane foam 2 breaking at the split portion of the in-mold foamed molded product 4 when the polyurethane foam 2 is formed on the in-mold foamed molded product unit 5. As such, in terms of adhesion with the polyurethane foam, a shape such as that illustrated in FIG. 5(A) may be preferable, and in terms of securing strength of the polyurethane foam, a shape such as that illustrated in FIG. 5(C) may be preferable. Note that the in-mold foamed molded product 4 can be divided along three or more boundaries. For example, the in-mold foamed molded product 4 can include a groove such as that described above at two or more positions.

FIG. 5(D) is a cross-sectional view taken along the line C-C' indicated in FIG. 5(C). As illustrated in FIG. 5(D), on a first side, a portion of the insert material 3 is covered by the in-mold foamed molded product 4 along the perimeter of that portion, and on a second side, a portion of the insert material 3 is covered by the polyurethane foam 2 along the perimeter of that portion. With this configuration, on the first side, the portion of the insert material 3 covered by the in-mold foamed molded product 4 does not come into contact with the polyurethane foam 2. However, on the second side, the portion of the insert material 3 which is exposed to the outside of the in-mold foamed molded product 4 enables contact with the polyurethane foam 2.

In the configuration where the in-mold foamed molded product 4 is split at the boundary dividing the in-mold foamed molded product 4, a distance by which the molded body piece 4A and the molded body piece 4B are separated is hereinafter also described as a "division width". The term "division width" is also used to describe the width of the groove provided by cutting out a portion of the in-mold foamed molded product 4. In a case where the distance by which the molded body pieces 4A and 4B are separated is not uniform, or in a case where the width of the groove is not uniform, the term "division width" refers to a dimension equivalent to the greatest distance or width. In terms of adhesion with the polyurethane foam, a larger division width may be more preferable. However, depending on the shape of the foamed composite molded product 1, an excessively large division width brings about the risk of a reduction in the cushioning property or strength of the foamed composite molded product 1. As such, the division width is adjusted as necessary. A larger size of the in-mold foamed molded product 4 enables a larger division width. As such, there is no upper limit to the division width. However, in terms of enabling wide use, the division width may be, for example, not less than 1.0 mm and not more than 150.0 mm, more not less than 5.0 mm and not more than 30.0 mm, or not less than 5.0 mm and not more than 15.0 mm.

Embodiment 3

FIG. 6 consists of diagrams each illustrating an exposed section of an insert material in accordance with Embodiment 3 of the present disclosure. In Embodiment 3, the total length of a portion of an insert material 3, which portion is exposed to the outside of an in-mold foamed molded product 4, is greater than the length (distance al) of an imaginary straight line segment connecting both ends of that portion. FIG. 6 illustrates examples of this.

Figure 6A:
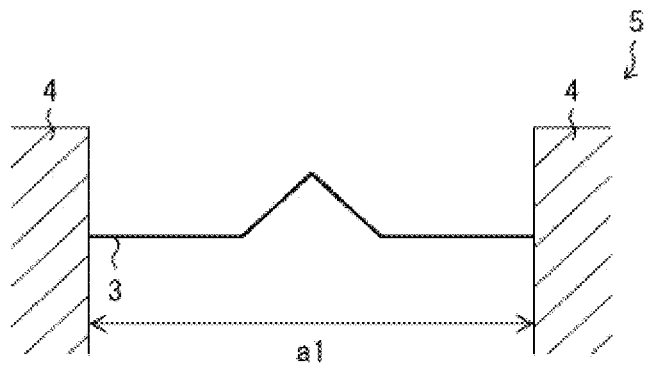
FIGS. 6(A), 6(B), 6(C) and 6(D) consist of diagrams each illustrating an exposed section of an insert material in accordance with Embodiment 3 of the present disclosure.

FIG. 6(A) illustrates a case where the insert material 3 is bent such that a center of an exposed section of the insert material 3 protrudes in the shape of a triangular protrusion. In comparison to a case where the exposed section of the insert material 3 is a straight line, a configuration as illustrated in FIG. 6(A), in which the center of the exposed section of the insert material 3 is in the shape of a triangular protrusion, increases the area of contact between the insert material 3 and polyurethane foam 2. A case where the exposed section of the insert material 3 is a straight line can also be described as a case where the total length of the exposed section of the insert material 3 is equal to the distance al. The above configuration improves the adhesion strength between the insert material 3 and the polyurethane foam 2 and also makes it possible to improve the adhesion strength between the in-mold foamed molded product 4 and the polyurethane foam 2. Note that the protrusion is not limited to being triangular and may instead be, for example, semicircular or rectangular.

Figure 6B:
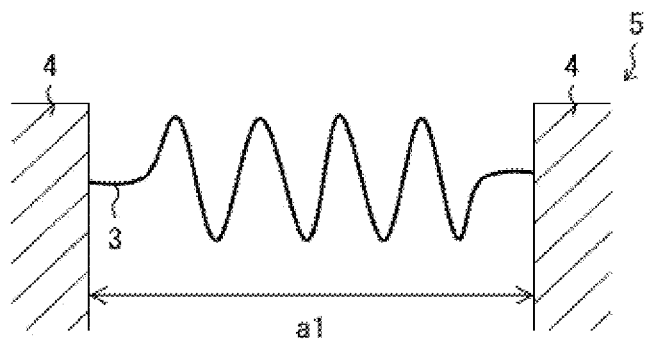

FIG. 6(B) illustrates a case where the exposed section of the insert material 3 is bent into a curved line such that the exposed section has a wave-like shape. Configuring the exposed section of the insert material 3 to have a wave-like shape, as illustrated in FIG. 6(B), increases the area of contact between the insert material 3 and the polyurethane foam 2, similarly to the case illustrated in FIG. 6(A). The above configuration improves the adhesion strength between the insert material 3 and the polyurethane foam 2 and also makes it possible to improve the adhesion strength between the in-mold foamed molded product 4 and the polyurethane foam 2. In the configuration illustrated in FIG. 6(B), the area of contact between the insert material 3 and the polyurethane foam 2 is greater than in the configuration illustrated in FIG. 6(A). As such, the configuration illustrated in FIG. 6(B) makes it possible to improve adhesion strength between the in-mold foamed molded product 4 and the polyurethane foam 2 even more than does the configuration illustrated in FIG. 6(A). In other words, a greater area of adhesion between an exposed section of the insert material 3 and the polyurethane foam 2 enables a greater improvement of the adhesion strength between the in-mold foamed molded product 4 and the polyurethane foam 2. Note that in the configuration illustrated in FIG. 6(B), the exposed section of the insert material 3 may be spiral-shaped instead of being wave-like.

Figure 6C:
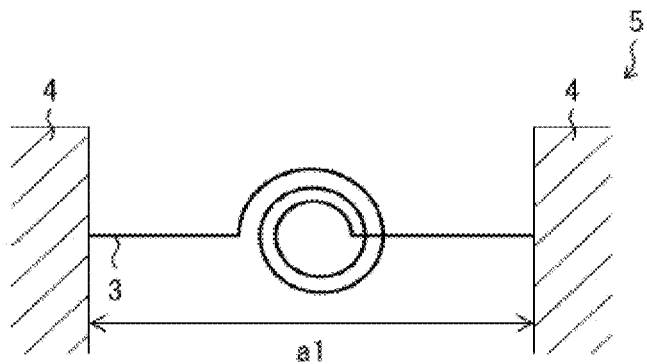

FIG. 6(C) illustrates a case where the exposed section of the insert material 3 is curled a number of times so as to have a coiled shape. Configuring the exposed section of the insert material 3 to have a coiled shape, as illustrated in FIG. 6(C), increases the area of contact between the insert material 3 and the polyurethane foam 2. As such, the configuration of FIG. 6(C) brings about effects similar to those of FIGS. 6(A) and 6(B).

Figure 6D:
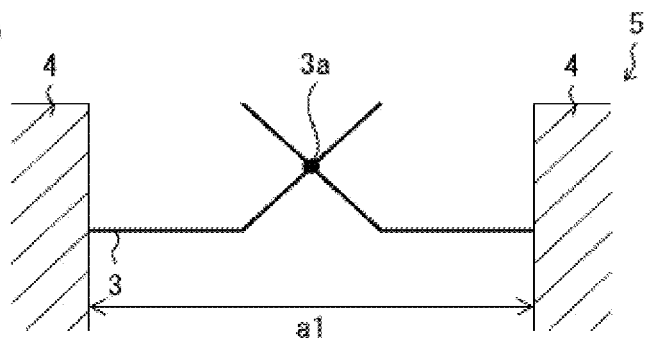

FIG. 6(D) illustrates a case where a first end of the insert material 3 which is exposed to the outside of the in-mold foamed molded product 4 is in mutual contact with a second end of the insert material 3 which is also exposed to the outside of the in-mold foamed molded product 4, and the first and second ends are attached to each other by being welded at their point of contact. As illustrated in FIG. 6(D), the insert material 3 has a shape including a portion (a welding point 3a) where the first and second ends of the insert material 3 are attached to each other. In this configuration, the first end of the insert material 3 and/or the second end of the insert material 3 are/is bent. This increases the area of contact between the insert material 3 and the polyurethane foam 2. As such, the configuration of FIG. 6(D) brings about effects similar to those of FIGS. 6(A), 6(B), and 6(C).

Embodiment 4

FIG. 7 consists of diagrams each illustrating an example in which a structure is attached to an exposed section of an insert material, in accordance with Embodiment 4 of the present disclosure.

Figure 7A:
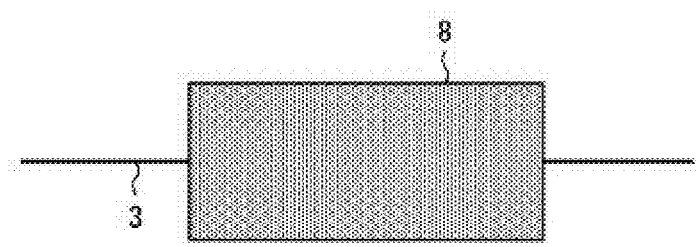
FIGS. 7(A), 7(B), and 7(C) consist of diagrams each illustrating an example in which a structure is attached to an exposed section of an insert material, in accordance with Embodiment 4 of the present disclosure.

FIG. 7(A) is a side view of a structure 8 attached to an exposed part of an insert material 3. As illustrated in FIG. 7(A), the structure 8, which is rectangular in a side view thereof, is attached to a center of the exposed part of the insert material 3. In this configuration, the structure 8 may have a rectangular parallelepiped shape. The structure 8 may alternatively have a cylindrical shape.

The material of the structure 8 is not particularly limited. However, the material of the structure 8 may be a metal, because a metal can be easily obtained and easily processed. Because polyurethane foam 2 can envelop the structure 8, it is possible to make the polyurethane foam 2 less likely to become separated from an in-mold foamed molded product unit 5. In particular, in a case where the material of the structure 8 attached to the exposed part of the insert material 3 has a high affinity with the polyurethane foam 2 and provides sufficient adhesion strength (for example, if the material of the structure 8 is iron), the structure 8 and the polyurethane foam 2 will adhere to each other. In comparison to a case where only the insert material 3 adheres to the polyurethane foam 2, this configuration makes it possible to provide a new region of adhesion, between the polyurethane foam 2 and the structure 8. As such, this configuration increases the area of adhesion between an in-mold foamed molded product unit 5 and the polyurethane foam 2 and makes it possible to improve the adhesion strength therebetween.

In a case where the material of the insert material 3 has low affinity with the polyurethane foam 2 such that adhesion between the insert material 3 and the polyurethane foam 2 is poor, the material of the structure 8 may have high affinity with the polyurethane foam 2 such that adhesion strength between the structure 8 and the polyurethane foam 2 is high. For example, the material of the structure 8 can be iron. This makes it possible for the structure 8 and the polyurethane foam 2 to adhere to each other. As such, it is possible to improve adhesion between the in-mold foamed molded product unit 5 and the polyurethane foam 2.

Figure 7B:
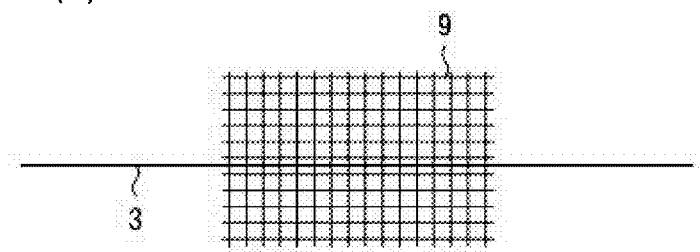

FIG. 7(B) illustrates a case where a structure attached to the insert material 3 is mesh-like. As illustrated in FIG. 7(B), a structure 9, which is mesh-like, is attached to the center of the exposed part of the insert material 3.

Configuring the structure 9 attached to the insert material 3 so as to be mesh-like allows the polyurethane foam 2 to adhere to the structure 9. Similarly to the configuration of FIG. 7(A), this configuration makes it possible to increase the area of adhesion between the polyurethane foam 2 and a member whose affinity with the polyurethane foam 2 is greater than that of the in-mold foamed molded product 4. As such, this configuration makes it possible to improve the adhesion strength between the structure 9 and the polyurethane foam 2. Furthermore, because the structure 9 is mesh-like, the polyurethane foam 2 enters into the mesh, thereby enabling further improvement of adhesion strength. In a case where the polyurethane foam 2 envelops the structure 9, because the structure 9 is mesh-like, the polyurethane foam 2 enters into the mesh. This makes it possible to make the polyurethane foam 2 less likely to become separated from the structure 9 attached to the insert material 3.

Similarly to the configuration of FIG. 7(A), in a case where the material of the insert material 3 does not exhibit adhesion with the polyurethane foam 2, the material of the structure 8 may have high affinity with the polyurethane foam 2 such that adhesion strength with the polyurethane foam 2 is high. For example, the material of the structure 8 attached to the exposed part of the insert material 3 can be iron. With this configuration, it is possible for the structure 9, attached to the exposed part of the insert material 3, and the polyurethane foam 2 to adhere to each other. This makes it possible for the structure 9 and the polyurethane foam 2 to adhere to each other. It is therefore possible for the in-mold foamed molded product 4 and the polyurethane foam 2 to adhere to each other.

Figure 7C:
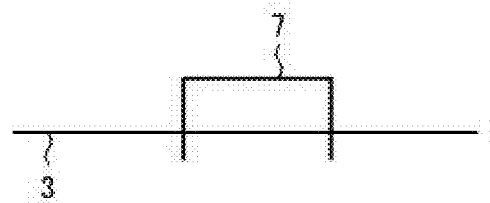

FIG. 7(C) illustrates a case where a structure 7, which is U-shaped and made of the same material as the insert material 3, is adhered to the center of the exposed section of the insert material 3. Similarly to the configurations of FIGS. 7(A) and 7(B), this configuration increases the area of contact between the insert material 3 and the polyurethane foam 2. As such, the configuration improves the adhesion strength between the insert material 3 and the polyurethane foam 2 and also makes it possible to improve the adhesion strength between the in-mold foamed molded product 4 and the polyurethane foam 2. Note that the material of the structure 7 may differ from the material of the insert material 3. The material of the structure 7 is not particularly limited. However, as with the configurations of FIGS. 7(A) and 7(B), it may be preferable that at least one of the insert material 3 and the structure 7 be made of a material having a high affinity with the polyurethane foam 2.

The present invention is not limited to the embodiments, but can be altered by a skilled person in the art within the scope of the claims. The present invention also encompasses, in its technical scope, any embodiment derived by combining technical means disclosed in differing embodiments. The following description will utilize Examples to discuss one or more embodiments of the present invention in further detail. Note, however, that the one or more embodiments of the present invention are not limited to these Examples.

EXAMPLES

In the present Examples, a foamed composite molded product 1 (including an in-mold foamed molded product unit 5 and polyurethane foam 2) was made, and a tension test was carried out on urethane. Examples 1, 2, and 3 correspond to FIGS. 8(A), 8(B), and 8(C), respectively. Table 1 below indicates the conditions and results of the urethane tension test.

In the Examples and the Comparative Example, used as polyolefin-based resin expanded particles was L-EPP36 (manufactured by Kaneka Corporation; ethylene-propylene random copolymer resin; bulk density: 20 g/L; melting point: 146° C.). In a pressure-resistant vessel, the L-EPP was impregnated with pressurized air such that internal pressure of the L-EPP was approximately 0.1 MPa(G).

Example 1

Figure 8A:
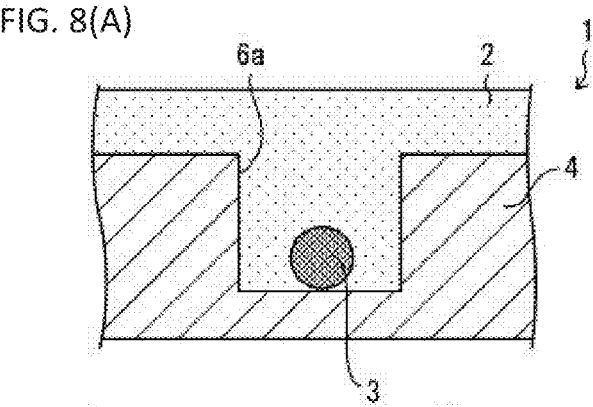
FIGS. 8(A), 8(B), and 8(C) consist of cross-sectional views each illustrating a variation of the structure illustrated in FIG. 3(B).

As illustrated in FIG. 8(A), in a foamed polypropylene molded product 4 (EPP molded product) having an expansion ratio of 36 times (density of 25 g/L), a blind hole 6a was formed by transference of the shape of a mold. The blind hole 6a had a diameter of 27.5 mm and a depth of 30.0 mm. An in-mold foamed molded product unit was prepared such that an iron wire 3 (insert material 3) was exposed by the blind hole 6a. The iron wire 3 had a thickness so as to be 4.0 mm in diameter. In a case where the wire 3 (insert material 3) is in contact with the bottom of the blind hole 6a, as illustrated in FIG. 8(A), the position of the wire 3 will be described as being 0 mm.

The polyurethane foam 2 was formed in the blind hole 6a so as to be in contact with the wire 3, the wire 3 being exposed by the blind hole 6a of the in-mold foamed molded product unit 5 produced. Used as a urethane liquid was undiluted soft urethane liquid (Toyo Soflan R).

The foamed composite molded product 1 was thus obtained, and a tension test was carried out on the polyurethane foam 2 thereof. Specifically, the polyurethane foam 2 was subjected to a tension test in which tensile speed was 3.0 mm/s, and maximum load was measured.

Figure 9A:
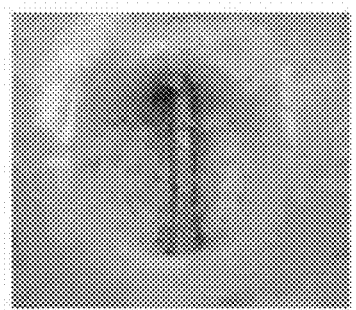
FIGS. 9(A), 9(B), 9(C), 9(D), and 9(E) consists of pictures each showing an example of a state of urethane after a tension test in accordance with Embodiment 2.

As a result, the polyurethane foam 2 separated from the wire 3 at a maximum tensile load of 3.10 kgf, but some of the polyurethane foam 2 remained on the outer circumference of the wire 3. The state of the wire 3 at that time is shown in FIG. 9(A).

Example 2

Figure 8B:
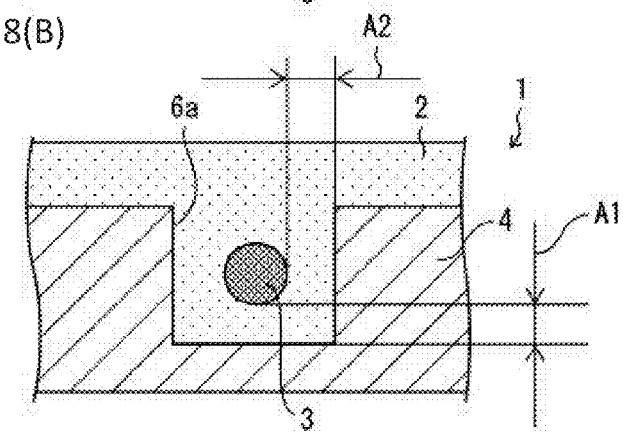

Example 2 is similar to Example 1, except that a wire 3 (insert material 3) and an EPP molded product 4 were integrally molded such that the wire 3 was distanced from the bottom of a blind hole 6a by a distance A1 (13 mm), as illustrated in FIG. 8(B). A foamed composite molded product was thus produced, and a tension test was carried out on polyurethane foam 2 thereof. Note that the present Example is not limiting and that there is no particular lower limit to the distance A1. However, the distance A1 may be not less than 1 mm. This is because in a case where the distance A1 is excessively small, the polyurethane foam 2 will not be able to get into a position deeper than the wire 3. An upper limit of the distance A1 is set by the depth of the blind hole 6a, and as such is not particularly limited. Note, however, that in a case where a portion of a passenger's body is to be positioned above the blind hole 6a, the wire 3 may be positioned so as not to be above an upper surface in the periphery of the blind hole 6a (i.e., not above a surface of the EPP molded product 4 excluding the blind hole 6a). This is so as to avoid a reduction in the comfort of the passenger. A lower limit of a distance A2 is not particularly limited. However, the distance A2 may be not less than 1 mm, so as to allow the polyurethane foam 2 to enter a space between the wire 3 and the EPP molded product 4. An upper limit of the distance A2 is set by the diameter of the blind hole 6a, and as such is not particularly limited.

Figure 9B:
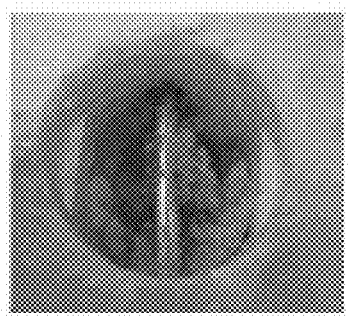

As a result, urethane separated from the wire 3 at a maximum tensile load of 6.00 kgf. The state of the wire 3 at that time is shown in FIG. 9(B). As illustrated in FIG. 9(B), some urethane remained in the blind hole at a position deeper than the wire 3. Example 2 enabled an increase in the area of adhesion between the wire 3 and the urethane and thus enabled an improvement in the adhesion strength between the wire 3 and the urethane. As such, when the urethane was tensioned, the urethane broke near the wire 3, and thus portions of the urethane at a position deeper than the wire 3 remained. With Example 2, it is possible for the urethane to envelop the wire 3, and it is therefore possible to make the urethane less likely to become separated from the wire 3. In the present Examples, the word "adhere" is used to refer to a state in which the urethane does not become separated from the wire 3 when the urethane is tensioned with a tensile load whose strength exceeds 2.75 kgf.

Example 3

Figure 8C:
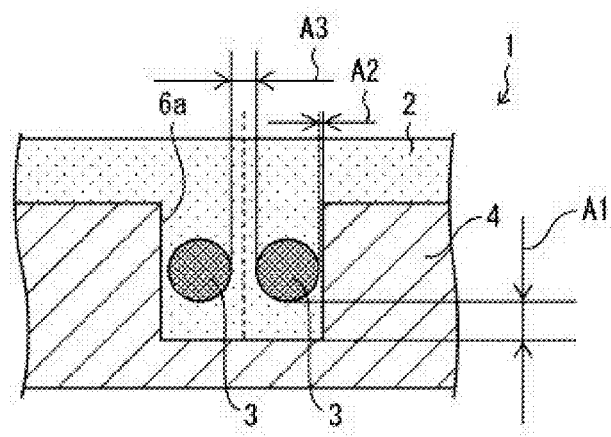

In Example 3, two wires 3 and 3 (insert material 3) were exposed by a single blind hole 6a, as illustrated in FIG. 8(C). A foamed composite molded product was produced similarly to that of Example 2, except that there were two wires 3 and 3 provided so as to be distanced from the bottom of the blind hole 6a by a distance A1 (13 mm) and distanced from each other by a distance A3 (2.5 mm). A tension test was carried out on polyurethane foam 2 as in Example 2. Note that the present Example is not limiting and that there is no particular lower limit to the distance A3. However, the distance A3 may be not less than 1 mm, so that the polyurethane foam 2 can enter a space between the two wires 3 and 3. An upper limit of the distance A3 is set by the diameter of the blind hole 6a, and as such is not particularly limited. In a case where the foamed composite molded product 1 includes two wires 3, it may be preferable that both of the wires 3 are distanced from the bottom of the blind hole 6a. Instead of including two wires 3, the foamed composite molded product 1 may include three or more wires 3. At least one of the two wires 3, or at least one of the three or more wires 3, may be distanced from the bottom of the blind hole 6a (that is, one or more of the wires 3 may be configured so as not to be distanced from the bottom of the blind hole 6a).

Figure 9C:
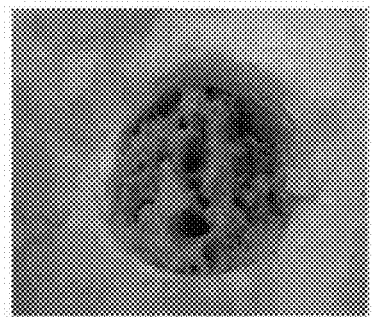

As a result, urethane separated from the wires 3 at a maximum tensile load of 6.50 kgf. The state of the wires 3 at that time is shown in FIG. 9(C). As illustrated in FIG. 9(C), some of the urethane remained near the wires 3, and some of the urethane remained in the blind hole 6a at a position deeper than the wires 3. Furthermore, in comparison to Examples 1 and 2, a greater amount of the urethane remained in the blind hole 6a. This is presumably because, in comparison to Example 2, the configuration including two wires 3 enables an increase in the area of adhesion between the wires 3 and the urethane and thus enables an improvement in the adhesion strength between the wires 3 and the urethane. As such, with the configuration of Example 3, it is possible for the urethane to envelop the two wires 3 exposed by the blind hole 6a, and it is therefore possible to make the urethane less likely to become separated from the wires 3.

Comparative Example

A foamed composite molded product 1 was produced similarly to that of Example 1, except that no wire 3 was used. A tension test was carried out on polyurethane foam 2 as in Example 1.

Figure 9D:

As a result, urethane separated from an in-mold foamed molded product unit 5 at a tensile load of 2.75 kgf (in other words, the urethane had not adhered to the in-mold foamed molded product unit 5). The state of the in-mold foamed molded product unit 5 at that time is shown in FIG. 9(D). As illustrated in FIG. 9(D), in the configuration where no wire 3 was used, almost no urethane remained in a blind hole 6a. This indicates that there was almost no adhesion between an in-mold foamed molded product 4 and the urethane. Tensile strength of the Comparative Example was also weaker compared to the tensile strength of Examples 1 to 3.

Figure 9E:
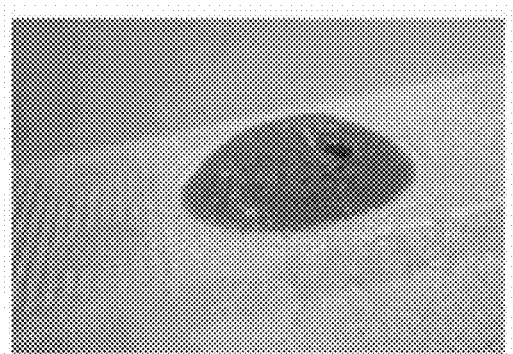

As a control, FIG. 9(E) shows a state in which urethane is adhered to a wire 3.

TABLE 1

|  | Thickness of wire | Position of wire (mm) | Number of wires | Tensile load (kgf) | State of polyurethane foam |
|---|---|---|---|---|---|
| Example 1 | 4 (Diameter) | 0 | 1 | 3.10 | Urethane remaining on outer circumference of wire |
| Example 2 | 4 (Diameter) | 13 | 1 | 6.00 | Urethane remaining beneath wire |
| Example 3 | 4 (Diameter) | 13 | 2 | 6.50 | Urethane remaining around and beneath wire |
| Comparative Example | (No wire) | — | — | 2.75 | Almost no urethane remaining |

[Supplemental Remarks]

A foamed composite molded product in accordance with one or more embodiments of the present invention includes: an in-mold foamed molded product made of thermoplastic resin; an insert material provided integrally with the in-mold foamed molded product; and polyurethane foam, at least a portion of the insert material being exposed to an outside of the in-mold foamed molded product, the portion of the insert material which portion is exposed to the outside of the in-mold foamed molded product being in contact with the polyurethane foam.

With the above configuration, at least a portion of the insert material provided integrally with the in-mold foamed molded product is exposed. This makes it possible for the exposed part of the insert material to adhere to the polyurethane foam. It is also possible for the polyurethane foam to envelop the exposed part of the insert material. As such, used as a material of the insert material is a material which has better adhesion with the polyurethane foam than does the in-mold foamed molded product. This makes it possible to achieve a foamed composite molded product in which polyurethane foam is unlikely to become separated from an in-mold foamed molded product unit, the in-mold foamed molded product unit including an in-mold foamed molded product and an insert material which are integrally provided. Note that the insert material may have a higher strength than the in-mold foamed molded product.

In one or more embodiments of the present invention, the foamed composite molded product may be configured such that the portion of the insert material which portion is exposed to the outside of the in-mold foamed molded product is exposed by at least one selected from the group consisting of: (1) a blind hole formed in the in-mold foamed molded product; (2) a through hole formed in the in-mold foamed molded product; (3) a gap formed by two of a plurality of molded body pieces, the plurality of molded body pieces being obtained by dividing the in-mold foamed molded product; and (4) a perimeter of an outer surface of the in-mold foamed molded product.

The above configuration makes it possible to easily expose, to the outside of the in-mold foamed molded product, at least a portion of the insert material integrally provided with the in-mold foamed molded product.

In one or more embodiments of the present invention, the foamed composite molded product may be configured such that the portion of the insert material which portion is exposed to the outside of the in-mold foamed molded product has a total length which is greater than a length of an imaginary straight line segment connecting both ends of the portion.

With the above configuration, the shape of the portion of the insert material, which portion is exposed to the outside of the in-mold foamed molded product, is changed. This makes it possible to increase an area of contact between the insert material and the polyurethane foam. The above configuration therefore makes it possible to make polyurethane foam less likely to become separated from an in-mold foamed molded product unit.

In one or more embodiments of the present invention, the foamed composite molded product may be configured such that: the portion of the insert material which portion is exposed to the outside of the in-mold foamed molded product is exposed by the blind hole formed in the in-mold foamed molded product; and at least a part of the portion of the insert material which portion is exposed to the outside of the in-mold foamed molded product is enveloped by the polyurethane foam.

With the above configuration, at least a part of the portion of the insert material, which portion is exposed to the outside of the in-mold foamed molded product, is enveloped by the polyurethane foam. This makes it possible to make polyurethane foam less likely to become separated from an in-mold foamed molded product unit.

In one or more embodiments of the present invention, the foamed composite molded product may be configured such that the portion of the insert material which portion is exposed to the outside of the in-mold foamed molded product has a surface to which a structure different from the insert material is provided.

With the above configuration, a structure different from the insert material is provided to the portion of the insert material which portion is exposed to the outside of the in-mold foamed molded product. This makes it possible to provide a region in which the structure and the polyurethane foam are in contact. The above configuration therefore makes it possible to make polyurethane foam less likely to become separated from an in-mold foamed molded product unit.

In one or more embodiments of the present invention, the foamed composite molded product may be configured such that the structure is made of metal.

With the above configuration, the structure is made of metal. This makes it easy to obtain and process the structure.

In one or more embodiments of the present invention, the foamed composite molded product may be configured such that the insert material is made of metal.

With the above configuration, the insert material is made of metal. This makes it easy to obtain and process the insert material.

In one or more embodiments of the present invention, the foamed composite molded product may be configured such that the insert material is made of a material selected from the group consisting of inorganic fiber, fiber reinforced plastic, fiber reinforced metal, wood, concrete, iron, stainless steel, zinc, and aluminum.

With the above configuration, the insert material is made of a material as described above. This makes is possible for the insert material and the polyurethane foam to adhere to each other with sufficient strength.

In one or more embodiments of the present invention, the foamed composite molded product may be configured such that the insert material and the polyurethane foam are adhered to each other.

With the above configuration, the insert material and the polyurethane foam are adhered to each other. This makes it possible to increase the strength of adhesion between an in-mold foamed molded product unit and polyurethane foam, in comparison to a case where polyurethane foam is adhered only to an in-mold foamed molded product.

In one or more embodiments of the present invention, the foamed composite molded product may be configured such that the in-mold foamed molded product and the polyurethane foam are not adhered to each other.

In one or more embodiments of the present invention, the foamed composite molded product may be configured such that at least a portion of a surface of the in-mold foamed molded product is not covered by the polyurethane foam and is exposed.

In one or more embodiments of the present invention, the foamed composite molded product may be configured such that the in-mold foamed molded product is made of an olefin resin.

A method of producing a foamed composite molded product in accordance with one or more embodiments of the present invention includes the steps of: preparing an in-mold foamed molded product unit which includes (i) an in-mold foamed molded product made of thermoplastic resin and (ii) an insert material provided integrally with the in-mold foamed molded product, at least a portion of the insert material being exposed to an outside of the in-mold foamed molded product; and forming polyurethane foam such that the polyurethane foam is in contact with the portion of the insert material which portion is exposed to the outside of the in-mold foamed molded product.

With the above method, at least a portion of the insert material integrally provided with the in-mold foamed molded product is adhered to the polyurethane foam and/or enveloped by the polyurethane foam. As such, the method makes it possible to provide a foamed composite molded product in which polyurethane foam is unlikely to become separated from an in-mold foamed molded product unit.

REFERENCE SIGNS LIST

1 Foamed composite molded product
2 Polyurethane foam
3 Insert material (wire)
3a Welding point
4, 4a In-mold foamed molded product (EPP molded product)
5 In-mold foamed molded product unit
6 Opening
6a Blind hole
6b Through hole
7, 8, 9 Structure
A1, A2, A3, a1 Distance
4A, 4B Molded body piece Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A foamed composite molded product comprising:
an in-mold foamed molded product made of thermoplastic resin;
an insert material provided integrally with the in-mold foamed molded product; and polyurethane foam,
wherein at least a portion of the insert material is exposed to an outside of the in-mold foamed molded product,
wherein the portion of the insert material that is exposed to the outside of the in-mold foamed molded product is in contact with the polyurethane foam,
wherein the portion of the insert material that is exposed to the outside of the in-mold foamed molded product is exposed by
(1) a blind hole formed in the in-mold foamed molded product, wherein the blind hole by which the portion of the insert material that is exposed to the outside of the in-mold foamed molded product is exposed by at least one selected from the group consisting of:
a structure in which the insert material is distanced from a bottom of the blind hole such that the insert material is exposed to the outside of the in-mold foamed molded product, from a top end of the insert material to a bottom end of the insert material; and
a structure in which the insert material is inset into the bottom of the blind hole and only an upper side of the insert material is exposed to the outside of the in-mold foamed molded product.

2. The foamed composite molded product according to claim 1, wherein at least a part of the portion of the insert material that is exposed to the outside of the in-mold foamed molded product is enveloped by the polyurethane foam.

3. The foamed composite molded product according to claim 1, wherein the portion of the insert material that is exposed to the outside of the in-mold foamed molded product has a total length which is greater than a length of an imaginary straight line segment connecting both ends of the portion.

4. The foamed composite molded product according to claim 1, wherein the portion of the insert material that is exposed to the outside of the in-mold foamed molded product has a surface to which a structure different from the insert material is provided.

5. The foamed composite molded product according to claim 4, wherein the structure is made of metal.

6. The foamed composite molded product according to claim 1, wherein the insert material is made of metal.

7. The foamed composite molded product according to claim 1, wherein the insert material is made of a material selected from the group consisting of inorganic fiber, fiber reinforced plastic, fiber reinforced metal, wood, concrete, iron, stainless steel, zinc, and aluminum.

8. The foamed composite molded product according to claim 1, wherein the insert material and the polyurethane foam are adhered to each other.

9. The foamed composite molded product according to claim 1, wherein the in-mold foamed molded product and the polyurethane foam are not adhered to each other.

10. The foamed composite molded product according to claim 1, wherein at least a portion of a surface of the in-mold foamed molded product is not covered by the polyurethane foam and is exposed.

11. The foamed composite molded product according to claim 1, wherein the in-mold foamed molded product is made of a polyolefin resin.

* * * * *